(No Model.)
F. G. SMITH.
BICYCLE GUIDE AND LANTERN BRACKET.
No. 588,495.  Patented Aug. 17, 1897.
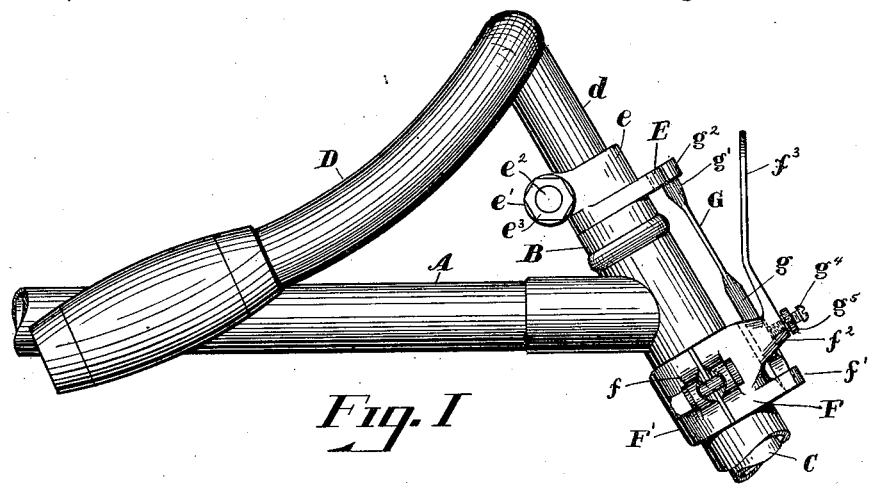
Fig. 1.
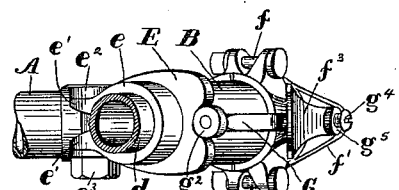
Fig. 2.
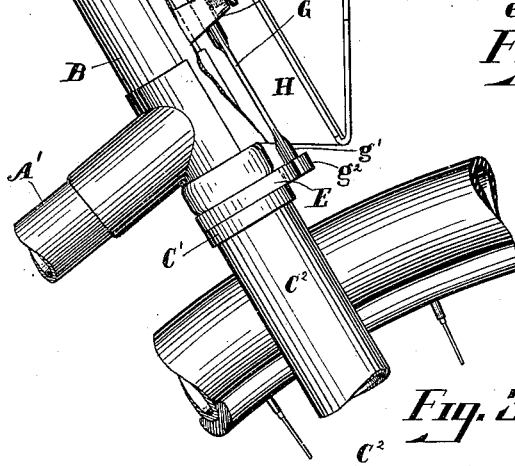
Fig. 3.
Fig. 5.
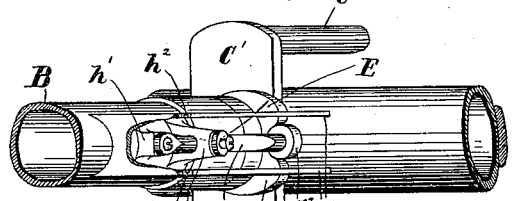
Fig. 4.
WITNESSES
Sherwood R. Taylor
Emma Lyford
INVENTOR
Frederick G. Smith
By Geo. J. Murray
Atty

UNITED STATES PATENT OFFICE.

FREDRICK G. SMITH, OF CINCINNATI, OHIO, ASSIGNOR OF FIVE-EIGHTHS TO BERNARD STOCK AND EDWARD KEATING, OF SAME PLACE.

BICYCLE GUIDE AND LANTERN-BRACKET.

SPECIFICATION forming part of Letters Patent No. 588,495, dated August 17, 1897.

Application filed October 28, 1896. Serial No. 610,281. (No model.)

*To all whom it may concern:*

Be it known that I, FREDRICK G. SMITH, a citizen of the United States, and a resident of Cincinnati, in the county of Hamilton and State of Ohio, have invented certain new and useful Improvements in Bicycle Guides and Lantern-Brackets, of which the following is a specification.

The object of my invention is an attachment for bicycles to automatically guide the wheel directly forward when the grip upon the handle-bar is relaxed or released and at the same time to furnish a bracket for the lantern.

The invention will be first fully described in connection with the accompanying drawings and then particularly referred to and pointed out in the claims.

Referring to the drawings, in which like parts are indicated by similar reference-letters wherever they occur throughout the various views, Figure 1 is a side elevation of so much of a bicycle-frame, with my improvement, as is necessary to illustrate my invention when attached to any of the ordinary bicycles now in common use. Fig. 2 is a detail plan view of the same. Fig. 3 is a view similar to Fig. 1, but with the base or frame of the attachment formed integral with or permanently secured to the crown-plate of the front-wheel fork and the forward tube of the frame, with part of the housing broken away. Fig. 4 is a detail plan view of the form shown in Fig. 3, but with the front plate of the housing and the lantern-bracket removed. Fig. 5 is a detail view, upon an enlarged scale, of the upper end of the spring-shaft and the friction-wheel shown in radial section thereon.

In the form shown in Figs. 1 and 2, A is the upper bar or tube of the frame, B the inclined front tube of the frame, and C the shaft of the steering-wheel fork, which turns in the tube B and is connected in the usual manner to the shaft $d$ of the handle-bar D. Upon the shaft $d$ is detachably secured a heart-shaped cam E by means of a split clip-band $e$, the body of which is formed integral with the cam and has rearwardly-extending perforated lugs $e'$ to receive a fastening-bolt $e^2$, which clamps the cam firmly upon the rod by means of the nut $e^3$.

Upon the tube B is clamped a two-part box F by means of bolts $f$, passing through laterally-extending perforated lugs from each half of the box. The rear or inner half F' of the box is a plain band, while the front portion has a forwardly-projecting lug $f'$, which has an angular perforation through it to receive the angular lower end of the spring G, a lower and forward extension $f^2$, perforated to pass the shaft of the spring, which terminates in an upper extended arm $f^3$, which furnishes the bracket for the lantern. The spring G has its lower end $g$, which passes through an elongated perforation in the extension $f^2$, rounded, as is also its upper end $g'$, which receives the friction-wheel $g^2$, which bears against the face of the cam E. The upper end of the spring-shaft $g'$ has an annular groove around it to receive the point of a screw which passes through the friction-wheel $g^2$ into said groove for the purpose of retaining the wheel in place. The extension $f^2$ of the box F is perforated and threaded to receive a screw $g^4$, the inner end of which bears against the shaft $g$ of the spring. The purpose of the screw is to force the shaft $g$ inward for the purpose of regulating the pressure with which the friction-wheel $g^2$ is held against the face of the cam E. When the tension is adjusted, it is held by means of a lock-nut $g^5$ upon the screw $g^4$.

It is evident that the steering-wheel and the rear wheel are held in alinement by the cam E and friction-wheel $g^2$, and when it is desired to turn it will require a little more pressure on the handle-bar to turn the steering-wheel to go in the direction desired, and that when facing in the proper direction and the handle-bars released the pressure of the spring will bring the friction-wheel to the position shown in Figs. 2 and 4 and retain it in that position without holding the handles rigidly so long as it is desired to proceed in a direct line forward.

In the modification shown in Figs. 3 and 4 the cam E is formed integral with the crown C' of the steering-wheel forks C², and an open front and bottom housing H, which has its back wall concave, is secured to the tube B in front of the lower frame-bar A'. From the base of this housing extends a projection $h$, which, like the projection $f^2$, is vertically slotted to pass the shaft $g$ of the spring-shaft G. In this form the spring-shaft G is inverted and the fixed end, instead of being angular to enter an angular perforation to prevent its rotation, is flattened and fastened upon a stud $h'$, projecting also from the base of the housing H, by a screw passing through its flattened perforated end and tapped into the stud $h'$. The tension of the spring is adjusted in the same manner as in the form shown in Figs. 1 and 2 by a set-screw and lock-nut. The front of the housing slides in grooves $h^2$ in the sides and is stopped by its overturned upper end $h^3$. The lower part of the housing is left open and the lantern-bracket $h^4$ has its sides slightly cut away to allow the front plate to slide down through the grooves. The purpose of making the front removable is in order to conveniently adjust the parts and regulate the tension of the friction-wheel against the face of the cam by tightening or loosening the set-screw bearing upon the spring-shaft.

It is obvious that many mere mechanical changes may be made without departing from the spirit or scope of my invention. Hence I do not desire to limit myself to the precise details shown.

What I claim as new, and desire to secure by Letters Patent, is—

1. The combination of the steering-wheel fork, the cam fixed to turn therewith, the front frame-bar, a box secured thereto having a forwardly-projecting perforated bracket to receive a spring-shaft and an upwardly-projecting arm to form a lamp-bracket, the spring-shaft fixed in said bracket and a wheel journaled upon the free end of said shaft to bear upon the cam, substantially as shown and described.

2. The hereinbefore-described guide and lantern-bracket for bicycles comprising the cam, the clamping-ring adapted to be secured to the shaft of the steering-wheel, the separable box to clamp upon the front frame-bar and having forward extensions to receive one end of the spring-shaft and having a lantern-bracket projecting up from one of said extensions, the spring-shaft held in one of said extensions, the friction-wheel journaled upon the end of said spring-shaft to bear upon the cam, an adjusting-screw to regulate the pressure of the wheel upon the cam, and bolts to secure the separable box and cam to the front frame-bar and steering-wheel fork.

FREDRICK G. SMITH.

Witnesses:
EMMA LYFORD,
GEO. J. MURRAY.